United States Patent [19]

Noguchi et al.

[11] Patent Number: 4,909,677

[45] Date of Patent: Mar. 20, 1990

[54] THROW AWAY CUTTING TOOL

[75] Inventors: Kazuo Noguchi; Nobuhiro Takahashi; Masafumi Hideshima; Tsuyoshi Asai, all of Itami, Japan

[73] Assignee: Sumitomo Electric Industries, Ltd., Osaka, Japan

[21] Appl. No.: 195,330

[22] Filed: May 18, 1988

[30] Foreign Application Priority Data

| May 20, 1987 | [JP] | Japan | 62-77599[U] |
| May 20, 1987 | [JP] | Japan | 62-77600[U] |
| May 20, 1987 | [JP] | Japan | 62-77601[U] |
| Dec. 8, 1987 | [JP] | Japan | 62-186912[U] |
| Dec. 8, 1987 | [JP] | Japan | 62-186913[U] |
| Apr. 5, 1988 | [JP] | Japan | 63-46367[U] |

[51] Int. Cl.$^4$ .................. B23B 27/08; B23B 27/14; B23B 27/04
[52] U.S. Cl. .................. 407/66; 407/32; 407/110; 407/117; 407/119
[58] Field of Search .................. 407/32, 50, 66, 109, 407/110, 117, 119

[56] References Cited

U.S. PATENT DOCUMENTS

| 2,950,523 | 8/1960 | Frommelt et al. | 407/32 |
| 3,270,396 | 9/1966 | Williams | 407/50 |
| 3,543,363 | 12/1970 | Diemond | 407/110 |
| 3,837,058 | 9/1974 | Barkley et al. | 407/109 |
| 4,558,974 | 12/1985 | Pano | 407/50 |
| 4,580,930 | 4/1986 | Zinner | 407/110 |
| 4,604,004 | 8/1986 | Armbrust | 407/110 |
| 4,642,003 | 2/1987 | Yoshimura | 407/119 |
| 4,668,132 | 5/1987 | Villa et al. | 407/110 |
| 4,687,383 | 8/1987 | Shimomura et al. | 407/46 |

FOREIGN PATENT DOCUMENTS

| 3420653 | 12/1985 | Fed. Rep. of Germany | 407/110 |
| 57-156124 | 9/1982 | Japan . | |
| 0780969 | 11/1980 | U.S.S.R. | 407/119 |

OTHER PUBLICATIONS

"Diamonite Tool Holder", advertisement Diamonite Products Manufacturing Company, 10-1956.

Primary Examiner—William Terrell
Attorney, Agent, or Firm—Armstrong, Nikaido, Marmelstein, Kubovcik & Murray

[57] ABSTRACT

A throw away cutting tool comprising a holder formed with a wedge groove and a throw away insert having a cutting edge at one end thereof and a wedge portion at the outer end, the wedge portion being adapted to be clamped in the wedge groove by elasticity of the material of the holder. The holder is at least partly made of cemented carbide for higher rigidity and cutting stability. Also, the radius of curvature at the deep end of the wedge groove is optimized for crack resistance. Further, the angle of the V-ridge on the holder is interrelated to the angle of the V-groove in the insert for more holding stability and crack resistance.

1 Claim, 10 Drawing Sheets

PRIOR ART

THROW AWAY CUTTING TOOL

The present invention relates to a throw away cutting tool having a throw away insert and its holder for use in deep grooving, cut-off machining, or the like.

A cutting tool for the abovesaid purposes is known which is comprised of a throw away insert and its holder so as to permit repeated use of the holder. Such a cutting tool is disclosed e.g. in Japanese Unexamined Patent Publication No. 57-156124.

The holder of such a tool has to hold a very small throw away insert. The size of the insert makes it impractical to use a known clamping mechanism such as a clamping block. Instead, the holder is formed with upper and lower jaws to define a wedge groove therebetween, whereas the throw away insert is formed with a wedge portion at an end opposite to its cutting edge so as to be elastically held between the upper and lower jaws of the holder by elasticity of the material of the holder.

This type of conventional cutting tool has the entire holder made of a special steel. If the tool is used to cut a narrow groove, the dimension of the holder in the direction of the width of the groove has to be accordingly small. This will lower the rigidity of the tool, thus increasing the tendency to chatter.

Further, since the holder is made of a special steel in spite of the fact that its widthwise dimension is limited, the wedge groove tends to open or widen when subjected to the cutting force, allowing the insert to retract and the cutting edge to get out of position. This impairs the machining accuracy. In an extreme case, machining might be interrupted.

Furthermore, the insert supporting portion of the holder can be worn out rapidly with repeated use, thus worsening the stability in holding the insert. Thus the tool life will be shortened.

Also, since the holder is made of steel, its vibration resistance is rather poor. This makes it impossible to increase the feed speed and to improve the machining efficiency and will limit the overhang of the holder from the fixture and thus the diameter of the bar to be cut off and the depth of groove to be machined.

An object of the present invention is to provide a throw away cutting tool of this type which obviates the abovesaid shortcomings.

In accordance with the present invention, there is provided a throw away cutting tool having a holder body formed with a wedge groove and a throw away insert having a cutting edge at one end thereof and a wedge portion at an end opposite to the cutting edge, the wedge portion being adapted to be clamped in the wedge groove by elasticity of the material of the holder so that the principal component of the cutting force will be received on one of two wedge surfaces of the wedge groove and its backside component will be received on the other, characterised in that the holder is at least partly made of cemented carbide.

Another feature of the present invention is that the wedge groove has a back end face out of contact with the throw away insert received therein, the back end face being curved with a radius R1 at a portion connecting with the other wedge surface of the wedge groove and with a radius R2 at a portion connecting with the one wedge surface, the radii R1 and R2 being determined as follows:

$R2 > R1$
$0.2 \leq R1 \leq 5$
$1 \leq R2 \leq 10$

A further feature of the present invention is that one of the wedge groove of the holder and the wedge portion of the throw away insert has its wedge surfaces axially ridged in V-shape whereas the other has its wedge surfaces axially grooved in V-shape, the groove and ridge at the lower side of the wedge groove having angles of $\theta_4$ and $\theta_3$, respectively, which is determined as $3° \leq \theta_4 - \theta_3$ the ridge having its top cut away so as to contact the rib along parallel lines which are apart from each other by a distance a, the distance a being decided as $a \leq 0.4W$ wherein W is the width of the cutting edge of the insert.

Other features and objects of the present invention will become apparent from the following description taken with reference to the accompanying drawings, in which:

Figure 1:
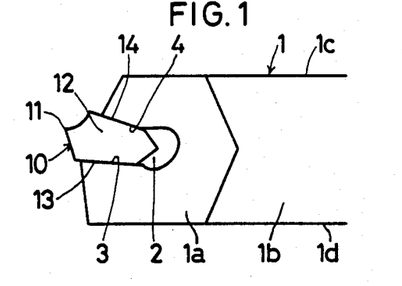
FIG. 1 is a side view of the first embodiment of the present invention.

Now referring to FIG. 1 which shows the first embodiment of the present invention, a holder body 1 has its insert supporting portion 1a made of steel as in a prior art holder and has its other portion 1b made of cemented carbide. The two portions are bonded together by brazing or other known method.

A wedge groove 2 is formed in the insert supporting portion 1a. A throw away insert 10 has a cutting edge 11 and a wedge portion 12 at rear end thereof to be press-fit in the wedge groove 2 so as to be fixedly seated in the groove. The principal component of the force which acts on the insert during cutting is received on one side 3 of the groove, whereas its backside component is received on the other side 4 thereof.

Figure 2:
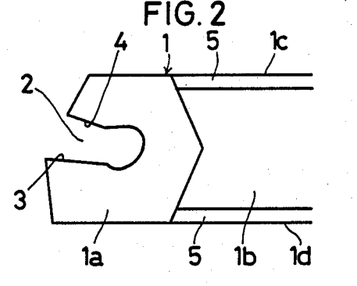
FIG. 2 is a side view of the second embodiment showing only the holder of the tool.

The holder 1 usually has its top and bottom surfaces 1c and 1d gripped tightly by a clamping means (not shown) so as to be held in a fixed position. The holder is gripped so hard that its gripped surface might chip if it is made of cemented carbide. As shown in FIG. 2, the other portion 1b made of cemented carbide may have its top and bottom surfaces covered with a layer 5 made of a tough material such as steel to effectively prevent the gripped surfaces from chipping.

Further, in order to prevent the insert 10 from shifting sideways, the wedge portion 12 may have its top and bottom surfaces 14 and 13 axially grooved or ridged whereas the wedge groove 2 has its top and bottom surfaces 4 and 3 ridged or grooved so as to be complimentary in sectional shape with the surfaces 14 and 13 so that the insert 10 will not be restrained from moving in its press-fit direction. Further, if such grooved and ridged surfaces have a V-shaped section, they will serve not only to prevent the insert from shifting sideways but also give the insert a widthwise centripetal pull. The holder body 1 may be formed with wedge grooves 2 at both ends thereof.

Figure 3:
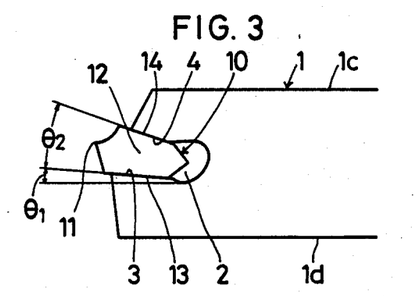
FIG. 3 is a side view of the third embodiment.

FIG. 3 shows the third embodiment in which the entire holder 1 is made of cemented carbide.

Figure 4:
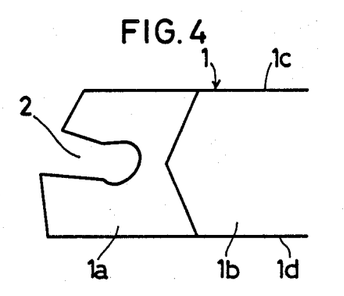
FIGS. 4 to 7 are side views of the fourth to seventh embodiments showing a portion of the holders.

In the fourth embodiment shown in FIG. 4, the insert supporting end 1a of the holder 1 is made of cemented carbide while the other portion 1b is made of steel. Both portions are bonded together by brazing or any other known method. With this embodiment, because the other portion 1b is made of steel, the entire holder has a slightly lower rigidity, but the wedge groove can be kept not only from opening but also from wearing as with the previous embodiments. From an economical viewpoint, this embodiment is advantageous over the previous ones. Another advantage of this embodiment is that even when the holder is gripped by a clamping means at its top and bottom surfaces 1c and 1d, the clamped portions are less liable to chip than the embodiment of FIG. 3 because the portion is made of steel.

Figure 5:
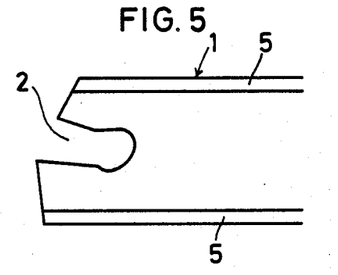

The tool shown in FIG. 5 is a modification of the tools shown in FIGS. 3 and 4. The holder 1 has its top and bottom portions 5 made of steel in order to prevent the surfaces to be clamped from chipping and to minimize its production cost. The central portion including the insert supporting portion is made of cemented carbide to obtain a high rigidity and to protect the portion formed with the wedge groove 2 against deformation and wear.

Figure 6:
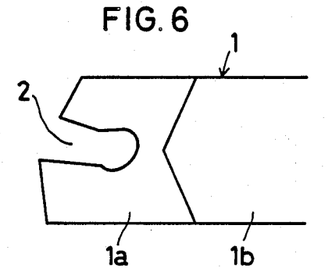

The tool shown in FIG. 6 has the holder 1 made of two different kinds of cemented carbides. Namely, one end portion 1a is made of a comparatively hard cemented carbide for high wear resistance at this portion whereas the other portion 1b bonded to the end portion 1a is made of a cemented carbide which has a higher toughness than the cemented carbide forming the end portion 1a. As a whole, the holder has a rigidity substantially equal to that of the tool shown in FIG. 3 and has its surfaces to be clamped sufficiently protected from getting chipped.

One advantage of making at least the insert supporting portion of the holder of cemented carbide is that the jaw portions formed over and under the wedge groove 2 are less likely to deform because of high Young's modulus of cemented carbide. Thus the jaw portions will effectively check the insert from withdrawing. But this tool has one drawback that the gripping force will be less.

Figure 7:
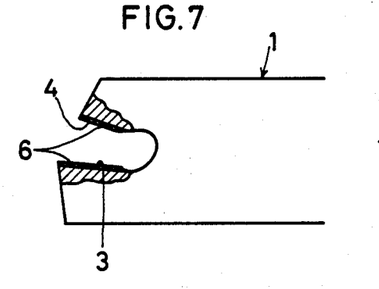

FIG. 7 shows a tool which is free from this problem. In this embodiment, layers 6 made of a soft metal such as nickel, chrome, copper or cobalt are plated on the surfaces 3 and 4 of the wedge groove 2. The layers 6 are adapted to elastically deform to increase the frictional resistance with the insert 10 so that it will not fall off the front end of the holder. The thickness of the layers 6 should be within the range of 2–1000 microns, preferably 5–500 microns. If the layers 6 are too thin, the frictional resistance will not increase sufficiently to hold the insert tightly. If they are too thick, the effects of making the insert supporting portion from cemented carbide will be lost.

The wedge groove 2 shown in FIG. 3 should preferably have a first wedge angle $\theta_1$ of 0–15 degrees (which is the inclination of the surface 3 with respect to the horizontal plane) and a second wedge angle $\theta_2$ of 6–14 degrees (which is the inclination between the surfaces 3 and 4) in view of the characteristics of cemented carbide.

Cemented carbide is four to five times harder than steel and thus has an excellent wear resistance. According to the present invention, cemented carbide is used to minimize the wear on the surfaces of the wedge groove for receiving a throw away insert and to hold the insert tight. Especially, the front end corner of the upper jaw is less liable to wear during cutting. The tool is thus assured of a longer service life.

Also, since the Young's modulus of cemented carbide is two to three times higher than steel, the tool is less likely to deform and the wedge groove is restrained from opening. Thus, the insert can be rigidly and stably held in the wedge groove. As a result, a workpiece can be machined more accurately. Non-deformability of the holder due to higher rigidity will enable the workpiece to be fed faster and allow the holder to be clamped with a larger overhang from the fixture without the fear of chattering during cutting. This will make it possible to use the tool for more extensive applications under less limited conditions.

Figure 8:
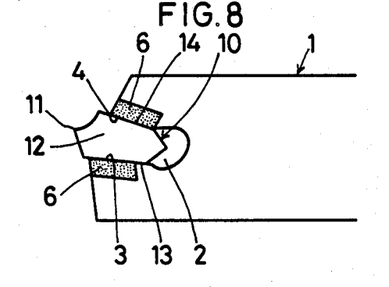
FIG. 8 is a side view of the eighth embodiment.
Figures 9, 10, 11, 12:
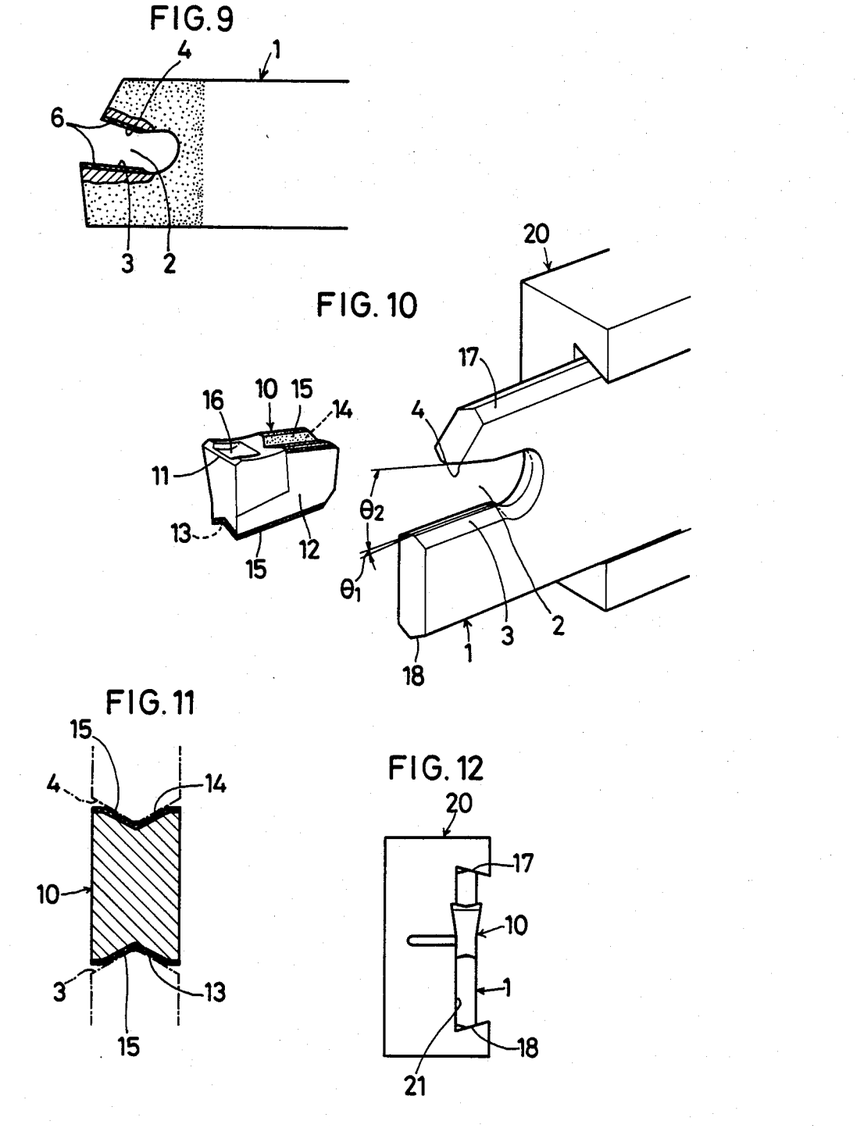
FIG. 9 is a partially cutaway side view of the holder of the nineth embodiment.
FIG. 10 is a perspective view of the tenth embodiment with the insert removed from the holder.
FIG. 11 is a sectional view of the wedge portion of the throw away insert of the same.
FIG. 12 is a front view of the same in use.

FIG. 8 shows the eighth embodiment in which the surfaces 3 and 4 of the wedge groove 2 are formed of a harder material than that of the holder body 1. Though in this embodiment chips 6 of cemented carbide are joined to the holder body 1 of steel by brazing or the like to form the hardened surfaces 3 and 4, the surfaces may be hardened in any other way. For example, as shown in FIG. 9, the holder body 1 of steel may have its wedge groove surfaces coated with layers 6 of a hard material such as TiN or TiC. The thickness of the covering layer should be about 3–10 microns.

The surfaces 3 and 4 of the wedge groove formed of a hard material are highly resistant to wear and the tool can be used stably for a longer time without wear.

The tool shown in FIGS. 10 to 12 includes a holder 1 having its insert supporting portion (i.e. its head formed with a wedge groove 2) formed of cemented carbide. The wedge groove 2 is formed with wedge surfaces 3 and 4.

As shown in FIG. 11, an insert 10 has its top and bottom surfaces 13, 14 coated with soft metal layers 15 made of a soft metal such as nickel, chrome, copper, cobalt or their alloy. The layers have to be provided at least partially on wedge surfaces 13 and 14 so as to increase the friction with the wedge surfaces 3 and 4. The layers should have a thickness of 2–1000 microns and preferably 5–30 microns from an economical viewpoint. If the layers are too thin, its frictional force would not increase sufficiently and if they are too thick, the expected effects of the cemented carbide holder will be lost.

The insert 10 of FIG. 10 is provided in its top rake face with a chip breaker groove 16. A breaker projection may be provided instead of the breaker groove.

In view of the characteristics of cemented carbide, the wedge groove 2 should preferably have a first wedge angle $\theta_1$ of 0–5 degrees (which is the angle of the surface 3 with respect to the horizontal plane) and a second wedge angle $\theta_2$ of 6–14 degrees (which is the actual wedge angle of the groove 2 between the surfaces 3 and 4).

The holder 1 of FIG. 10 should have its top and bottom surfaces 17, 18 wedge-shaped so as to be pressed at its one side against a reference supporting surface 21 of a tool block 20 taking advantage of a component of force which acts on the clamped surfaces. This enables the holder to be held stably in exact position in the tool block.

Figure 13A:
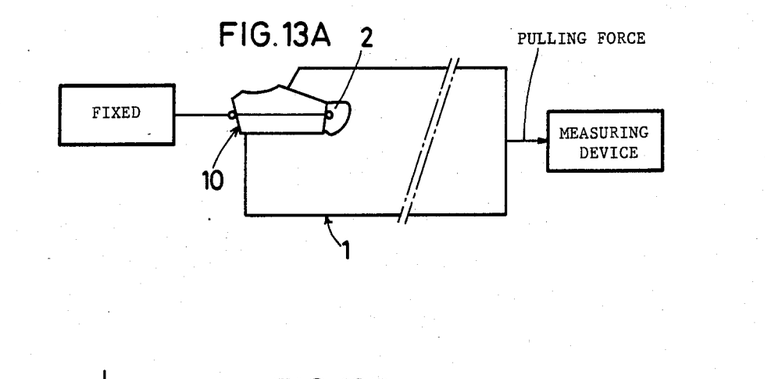
FIG. 13A is a schematic view showing the arrangement for testing the holding power of the holder.
Figure 13B:
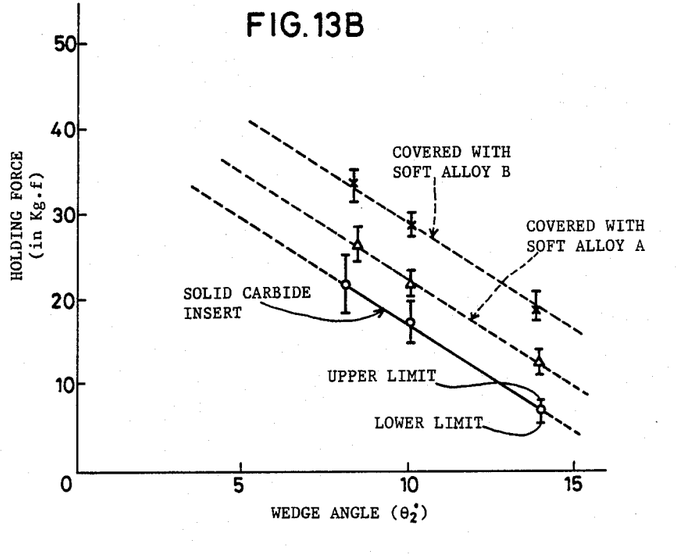
FIG. 13B is a graph showing the results of a comparison test for the holding power of the holder.

FIG. 13A shows an arrangement for and FIG. 13B shows the results of a comparison test in which the insert holding power of the holder of FIG. 10 was evaluated. As shown in the drawing, the holder 1 was drawn rearwardly with the insert 10 press-fit in the wedge groove 2 fixed in position. The minimum tensile force needed to cause a relative movement between the holder an the insert was measured as the insert holding power of the tool. The results show that the holding power of the tool increased about 30 per cent when the insert was coated with soft alloy A of nickel chrome family and about 70 per cent when the insert was coated with soft alloy B of copper family, compared with a cemented carbide insert not coated at all.

If the holder is made of cemented carbide, the wedge groove can be opened only slightly when the insert is press fit and the elastic recovery and thus the clamping force of the upper and lower jaws will decrease. But the insert can be more firmly held if it is coated with soft metal layers on its wedge surfaces since the soft metal layers can deform when the insert is press-fit, thus engaging the wedge surfaces on the wedge groove with an increased frictional force.

Figure 14:
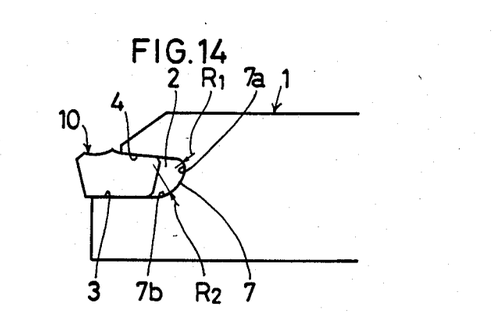
FIG. 14 is a side view of the eleventh embodiment.

Now referring to FIG. 14 showing the eleventh embodiment, the wedge groove 2 has such a sectional shape that its back end face 7 which is free from contact with the throw away insert received in the wedge groove is curved with a radius R2 at a portion 7b connecting with the wedge surface 3 (which receives the main component of a cutting force) and with a radius R1 at a portion 7a connecting with the wedge surface 4 (which receives the backside component of the cutting force). R1 and R2 should be determined as follows:

R2 > R1
$0.2 \leq R1 \leq 5$
$1 \leq R2 \leq 10$

One problem with a conventional holder is that the stress during cutting tends to concentrate at the root of the wedge surface 3. With this embodiment, since the portion 7b where large part of the cutting stress tends to concentrate has a larger curvature R2 than R1 and further the R1 and R2 values are correlated to each other in an optimum way so that the cutting stress is distributed uniformly over a wider area. Thus, the maximum stress value is reduced. For example, R1 may be set to 1R and R2 set to 3.4R.

Figure 15:
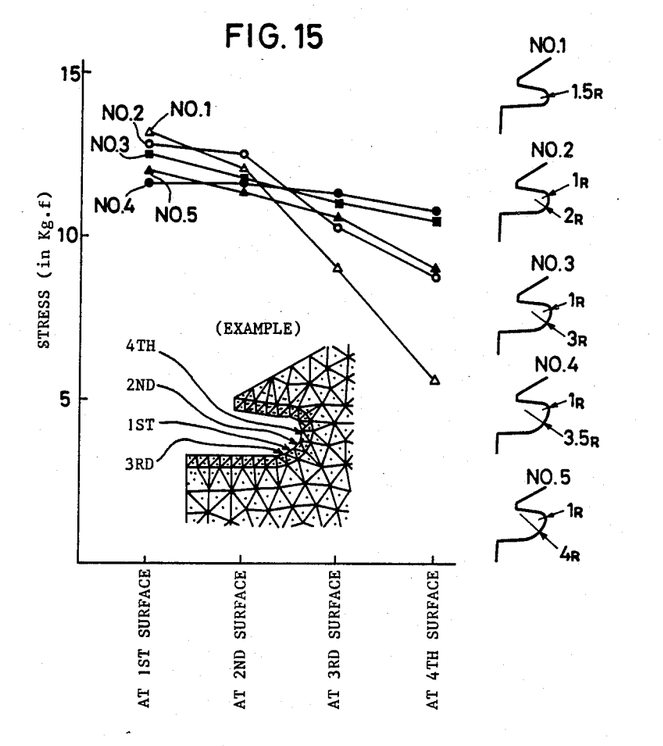
FIG. 15 is a graph showing stress values at the deep end face of the wedge groove of the specimens, the configurations of which are shown in the drawing.

The stress values at the back end portion 7 of the wedge groove were measured by use of the finite-element method analysis. FIG. 15 shows the results of measurement. Five specimens which were numbered from 1 to 5 in the drawing were tested, among which Nos. 2 to 5 were holders having curvatures which satisfy the conditions stipulated above. The drawing clearly shows that with such holders the cutting stress is less likely to concentrate on a limited area and thus the maximum stress value is reduced.

Figure 16:
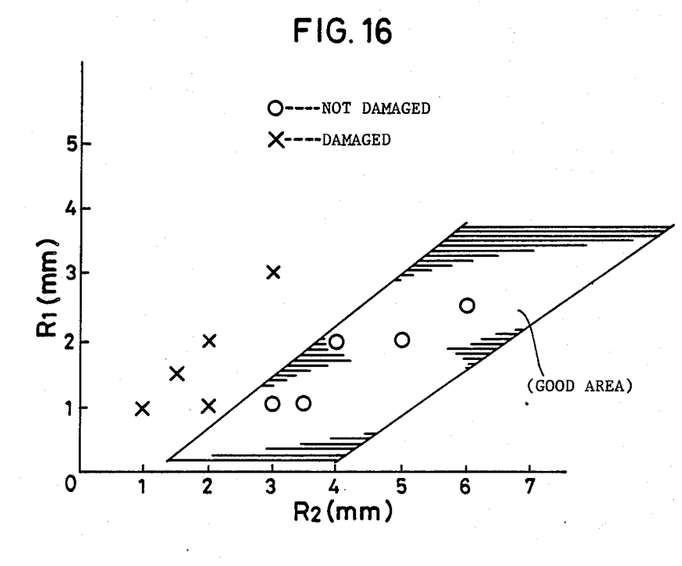
FIG. 16 is a view showing the state of holders with different R1 and R2 values after their use.

FIG. 16 shows the results of cutting tests with specimens having different R1 and R2 values. The results reveal that the holders of this embodiment were less liable to break during cutting.

Figures 17, 18:
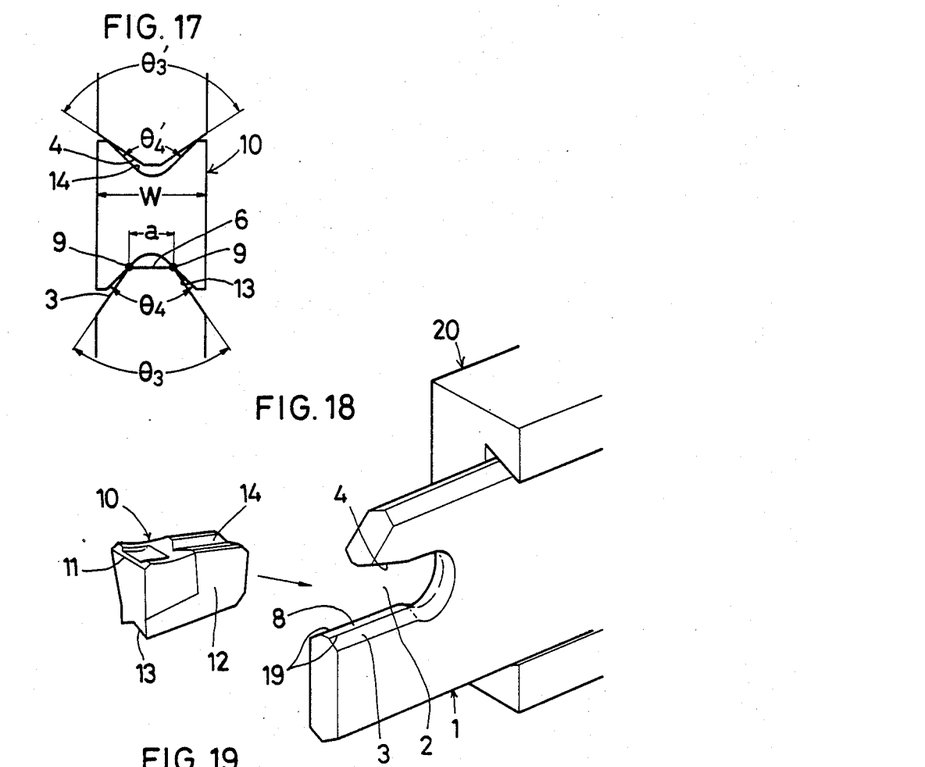
FIG. 17 is a sectional view of the twelfth embodiment showing the insert and the holder in engagement.
FIG. 18 is a perspective view of the entire tool of the same.

Next, referring to FIG. 17 showing the twelfth embodiment, wedge surfaces 3 and 4 on the upper and lower jaws of the holder are adapted to be in contact with wedge surfaces 13 and 14 on the insert 10 at contact portions 9, respectively.

Figure 19:
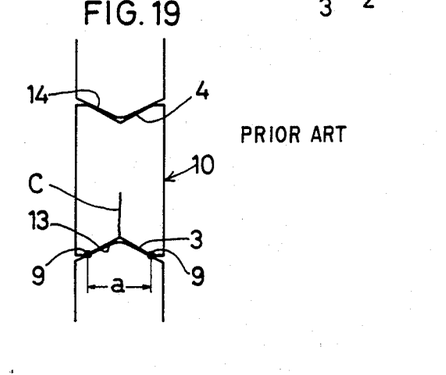
FIG. 19 is a sectional view of a prior art tool similar to FIG. 17.

The width a between the contact portions 9 shown in FIG. 19 should preferably be sufficiently wide to hold the insert in a stable and steady manner. Therefore, the angle of the V-shaped rib on the holder is usually slightly larger than the angle of the V-shaped groove in the insert so that the contact portions 9 will be located near the edges of the grooves and the ribs. But the inventor found that the wider the width a, the more the holder tends to develop a crack C as shown in FIG. 19.

In the twelfth embodiment of FIG. 17, the angle $\theta_4$ of the V-groove at the lower jaw and the angle $\theta_3$ of the V-rib at the lower jaw should be set as follows:

$3° \leq \theta_4 - \theta_3 < 10°$

Further, the width a between the contact portions 9 should be set against the width $\overline{W}$ of the cutting edge as follows:

$0.1\overline{W} < a < 0.4\overline{W}$

The angle $\theta_4'$ of the V-groove at the upper jaw and the angle $\theta_3'$ of the V-rib at the upper jaw are not so limited as those at the lower jaw, but the following requirement should be met for more stable support:

$\theta_3' > \theta_4'$

Figure 20A:
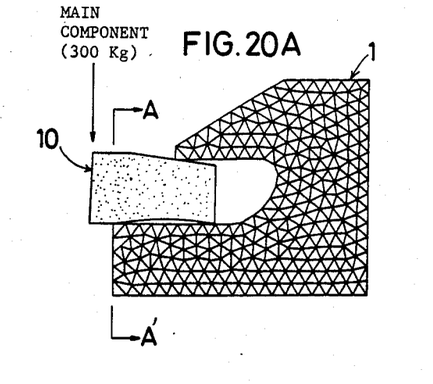
FIG. 20A is a side view showing the points analyzed in the FEM analysis.
Figure 20B:
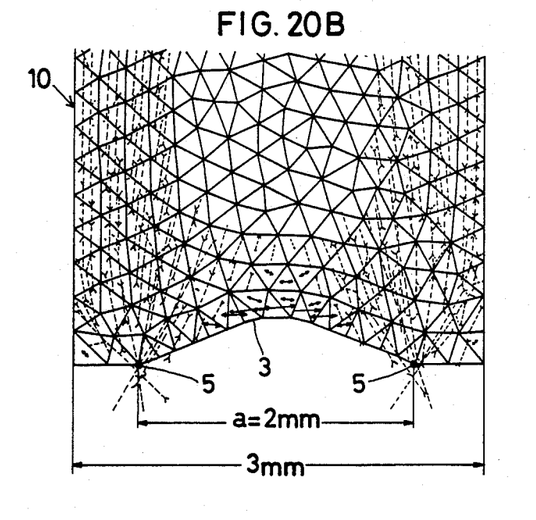
FIGS. 20B to 20E are views showing the results of analysis.
Figure 20C:
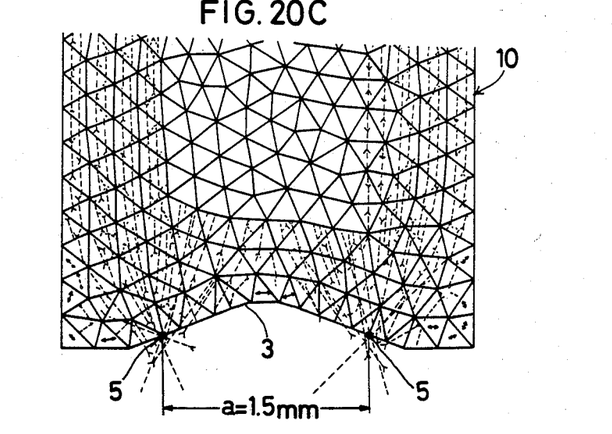
Figure 20D:
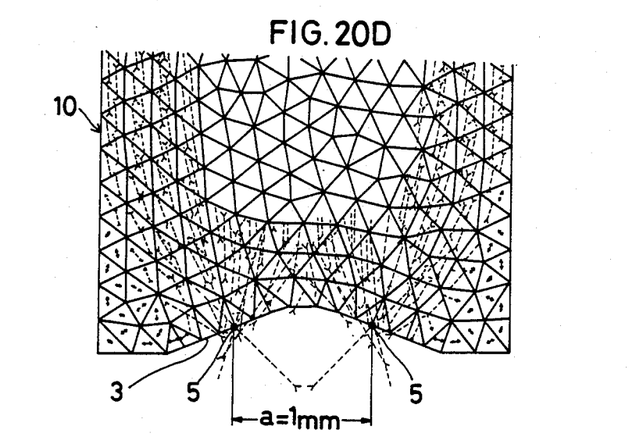
Figure 20E:
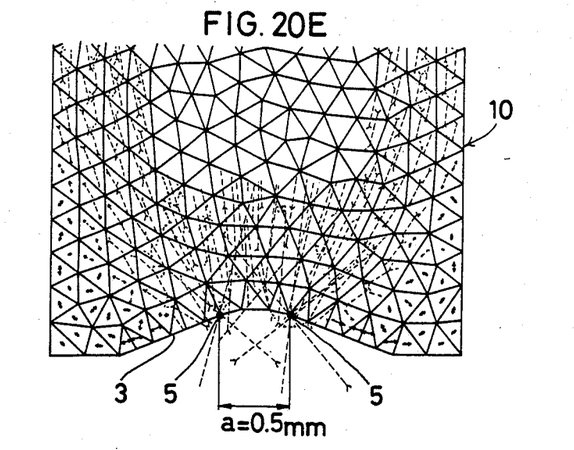

The distribution of stress over the insert depends upon the value of a. FIGS. 20b to 20e show stress distribution patterns over the section of the insert 10 taken along line A–A' of FIG. 20a which was obtained in the finite-element method analysis (FEM analysis) when the material (S45C) is fed at a feed speed f=0.4 mm/rev and machined with a 3 mm wide insert at a cutting speed V=150 m/min (the main component of the stress is 300 kgs. then). The drawings show that as the value a (in mm) grows, the insert tends to be subjected to rather strong tensile stress along the centerline of the V-shaped groove as shown by full line arrows. It will be also seen from the drawings that as the value a gets smaller, the full line arrows tend to change to chain line arrows which represent compressive stresses. Cemented carbide which is the material of the throw away insert tends to be weaker to tensile stress than to compressive stress. Thus, it is necessary to set the value a below a certain extent to prevent the insert from breaking.

Figure 21:
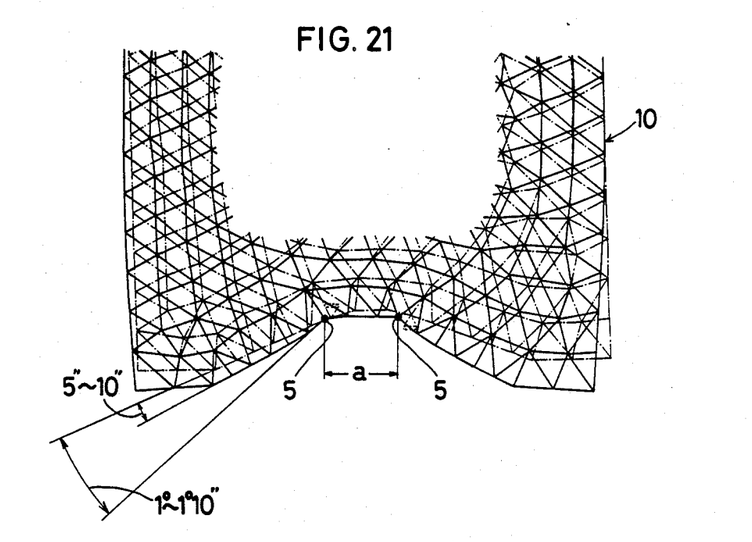
FIG. 21 is an analytic view obtained by the FEM showing how the contact portions displace.

As can be seen from the results of the FEM analysis shown in FIG. 21, the difference of angle $\theta(=\theta_4-\theta_3)$ between the angle $\theta_4$ of the V-groove and the angle $\theta_3$ of V-rib at the lower jaw of the holder should be set larger than a certain value. Otherwise, the insert may displace with respect to the holder, thus causing the contact portions to move. If the a value should change during cutting, the stress distribution pattern on the insert will become unstable. This may cause the insert to be broken, as will be seen from the results of experiments described below.

Figure 22:
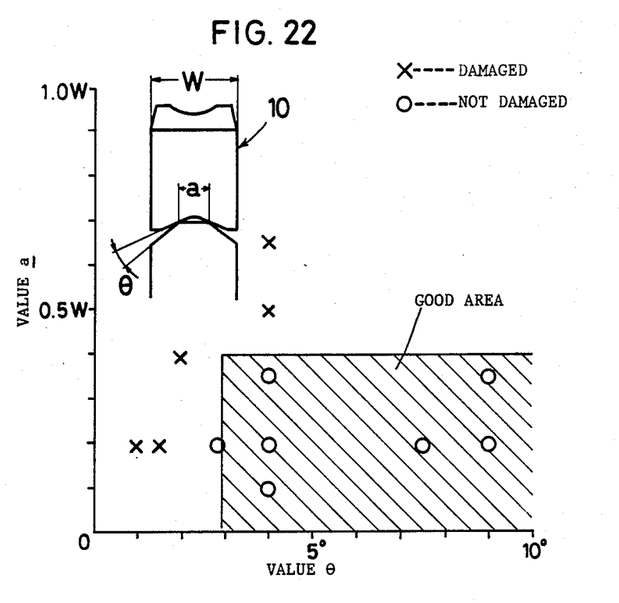
FIG. 22 is a view showing the results of cutting experiments with tools having different width values a and various differences of angle $\theta$.

FIG. 22 shows the results of the cutting experiments with inserts having different a and $\theta$ values. The results show that the optimum ranges of the a and $\theta$ values are $a \leq 0.4\overline{W}$ and $\theta \geq 3°$.

Now referring to FIG. 18, a holder 1 of this embodiment is formed in its head portion with a wedge groove 2 formed with top and bottom wedge surfaces 4 and 3. The bottom wedge surface 3 is truncated to form a top flat surface 8. The holder gets into contact with an opposite groove wedge surface at the edge lines 19 of the surface 8.

FIG. 17 shows a sectional view of the embodiment of FIG. 18 in which the value a is wider than in FIG. 19 and $\theta_3$, $\theta_4$, $\theta_3'$, $\theta_4'$ and a meet the abovesaid requirements.

Contrary to the arrangement of this embodiment, the tool may have its wedge surface 3 grooved in V-shape while forming the wedge surface 13 on the insert in the form of V-ridge. Similarly, the tool may have its wedge surface 4 grooved in V-shape while the wedge surface 14 on the insert may be formed with a V-shape ridge.

What is claimed is:

1. A throw away cutting tool, comprising: a holder body formed with wedge slot having at least two substantially opposing wedge surfaces; and a throw away insert having a cutting edge at one end thereof and a wedge portion at an end opposite to said cutting edge, wherein said wedge portion is clamped in said wedge slot solely by elasticity of the material of said holder body so that a principal component of a cutting force will be received on one of said at least two substantially opposing wedge surfaces of said wedge slot and a backside component of said cutting force will be received on the other, and wherein said holder body is entirely made of cemented carbide.

* * * * *